US007978032B2

(12) United States Patent
Chen et al.

(10) Patent No.: US 7,978,032 B2

(45) Date of Patent: Jul. 12, 2011

(54) LOCKING MECHANISM FOR PROTECTING A GROUND FAULT CIRCUIT INTERRUPTER FROM FAULTY RESETTING

(75) Inventors: Wusheng Chen, Yueqing (CN); Fu Wang, Yueqing (CN); Huaiyin Song, Yueqing (CN)

(73) Assignee: General Protecht Group, Inc., Yueqing (CN)

( * ) Notice: Subject to any disclaimer, the term of this patent is extended or adjusted under 35 U.S.C. 154(b) by 246 days.

(21) Appl. No.: 12/485,390

(22) Filed: Jun. 16, 2009

(65) Prior Publication Data

US 2009/0315652 A1 Dec. 24, 2009

(30) Foreign Application Priority Data

Jun. 20, 2008 (CN) .......................... 2008 1 0128730

(51) Int. Cl.

| | |
|---|---|
| ***H01H 75/00*** | (2006.01) |
| ***H01H 77/00*** | (2006.01) |
| ***H01H 83/00*** | (2006.01) |
| ***H01H 73/12*** | (2006.01) |
| ***H01H 67/02*** | (2006.01) |
| ***H01H 9/20*** | (2006.01) |
| ***H02H 3/00*** | (2006.01) |

(52) U.S. Cl. .................. 335/15; 335/6; 335/18; 335/21; 335/34; 335/46; 335/113; 335/168; 361/42

(58) Field of Classification Search .................. 335/2, 6, 335/18, 21, 24–26, 28, 32, 34, 113, 167–168, 335/46, 15; 361/42–50

See application file for complete search history.

(56) References Cited

U.S. PATENT DOCUMENTS

| | | | | |
|---|---|---|---|---|
| 5,831,503 | A * | 11/1998 | Beck et al. | 335/172 |
| 6,246,558 | B1 * | 6/2001 | DiSalvo et al. | 361/42 |
| 2002/0135958 | A1 * | 9/2002 | Germain et al. | 361/42 |
| 2003/0085783 | A1 * | 5/2003 | Macbeth | 335/18 |

* cited by examiner

*Primary Examiner* — Anh T Mai
*Assistant Examiner* — Mohamad A Musleh
(74) *Attorney, Agent, or Firm* — Tim Tingkang Xia; Morris, Manning & Martin, LLP

(57) ABSTRACT

A locking mechanism for protecting a ground fault circuit interrupter (GFCI) from being faultily reset. In one embodiment, the locking mechanism has a blocking member secured onto a lateral side of the movable assembly, a resilient member, and a locking member having a first end portion positioned against the resilient member, a second end portion positioned in relation to the blocking member, and a body portion defined between the first end portion and the second end portion. When the movable assembly is in a first (tripping) position, the expanding force of the resilient member applied to the first end portion of the locking member causes the second end portion of the locking member to be positioned against the blocking member so that no movement of the movable assembly from the first position to a second (resetting) position is allowed.

15 Claims, 3 Drawing Sheets

LOCKING MECHANISM FOR PROTECTING A GROUND FAULT CIRCUIT INTERRUPTER FROM FAULTY RESETTING

CROSS-REFERENCE TO RELATED PATENT APPLICATION

This application claims priority of Chinese Patent Application No. 200810128730.4, filed on Jun. 20, 2008, entitled "LOCKING MECHANISM FOR PROTECTING A GROUND FAULT CIRCUIT INTERRUPTER FROM FAULTY RESETTING," by Wusheng CHEN, Fu WANG, and Huaiyin SONG, the disclosure of which is incorporated herein by reference in its entirety.

FIELD OF THE PRESENT INVENTION

The present invention generally relates to a leakage current protection device for appliances. More particularly, the present invention relates to a locking mechanism for protecting a ground fault circuit interrupter from being faultily reset.

BACKGROUND OF THE PRESENT INVENTION

Ground fault circuit interrupter (GFCI) devices are designed to trip in response to the detection of a ground fault condition at an AC load. For example, the ground fault condition may result when a person comes into contact with the line side of the AC load and an earth ground at the same time, a situation that can result in serious injury. The GFCI device detects this condition by using a sensing transformer that detects an imbalance between the currents flowing in the line and neutral conductors of the AC supply, as will occur when some of the current on the line side is being diverted to ground. When such an imbalance is detected, a circuit breaker within the GFCI device is immediately tripped to an open condition, thereby opening both sides of the AC line and removing all power from the load.

A GFCI generally includes movable contacts, fixed contacts, and a movable assembly. The movable assembly is configured to responsively move between a first position in which the movable contacts are separated from the respective fixed contacts so that the GFCI is tripped, and a second position in which the movable contacts are in contact with the respective fixed contacts so that the GFCI is reset. Usually, A GFCI is preset in its tripping state in manufacture, i.e., the movable assembly is preset in the first position in which the movable contacts are separated from the respective fixed contacts.

However, due to vibrations or accidentally fallings during loading and transportation of the GFCI, the movable assembly may faultily be moved to the second position, thereby resetting the GFCI to make the movable contacts in contact with the respective fixed contacts. This may cause electric shocks, fire, appliance damage and/or personal injury during the installation of the GFCI.

Therefore, a heretofore unaddressed need exists in the art to address the aforementioned deficiencies and inadequacies.

SUMMARY OF THE PRESENT INVENTION

In one aspect, the present invention relates to a locking mechanism for protecting a GFCI from being faultily reset, where the GFCI has a movable assembly movable from a first position to a second position along a first direction and from the second position to the first position along a second direction opposite to the first direction, such that when the GFCI is tripped, the movable assembly is in the first position, and when the GFCI is reset, the movable assembly is in the second position.

In one embodiment the locking mechanism has a blocking member secured onto a lateral side of the movable assembly; a resilient member configured to have an expanding force along a third direction perpendicular to the first direction; and a locking member having a first end portion positioned against the resilient member, a second end portion positioned in relation to the blocking member, and a body portion defined between the first end portion and the second end portion, each end portion bended from the body portion.

When the movable assembly is in the first position, the expanding force of the resilient member applied to the first end portion of the locking member causes the second end portion of the locking member to be positioned against the blocking member so that no movement of the movable assembly from the first position to the second position is allowed.

When a force exceeding the expanding force of the resilient member is applied along a fourth direction opposite to the third direction to the first end portion of the locking member, it causes the locking member to move along the fourth direction so as to lower the second portion of the locking member below the bottom edge of the blocking member, whereby the movable assembly is released to be movable from the first position to the second portion.

In one embodiment, the blocking member is molded with the lateral side of the movable assembly. In another embodiment, the blocking member is secured onto the lateral side of the movable assembly by mounting means, where the mounting means includes glue, pegs, screws, and/or welding.

In one embodiment, the resilient member includes a spring.

In another aspect, the present invention relates to a GFCI. The GFCI in one embodiment includes a pair of fixed contact holders, each fixed contact holder having at least one fixed contact at one end, and a pair of movable contact holders, each movable contact holder having at least one movable contact at one end, each movable contact being arranged for contacting a respective fixed contact. The GFCI also includes a movable assembly configured to move from a first position in which each fixed contact is separated from the respective movable contact to a second position in which each fixed contact is in contact with the respective movable contact, along a first direction and from the second position to the first position along a second direction opposite to the first direction, the movable assembly causing movement of the pair of movable contact holders when it moves from the first position to the second position and from the second position to the first position.

Furthermore, the GFCI includes a locking mechanism comprising a blocking member secured onto a lateral side of the movable assembly; a resilient member configured to have an expanding force along a third direction perpendicular to the first direction; and a locking member having a first end portion positioned against the resilient member, a second end portion positioned in relation to the blocking member, and a body portion defined between the first end portion and the second end portion, each end portion bended from the body portion.

When the movable assembly is in the first position, the expanding force of the resilient member applied to the first end portion of the locking member causes the second end portion of the locking member to be positioned against the blocking member so that no movement of the movable assembly from the first position to the second position is allowed.

The GFCI also includes an electromagnetic tripping component configured such that when energized, the electromagnetic tripping component generates a first electromagnetic force that causes the movable assembly to be in the first position; and an electromagnetic resetting component configured such that when energized, the electromagnetic resetting component generates a second electromagnetic force that causes the movable assembly to be in the second position, wherein the electromagnetic tripping component and electromagnetic resetting component are different from one another.

In one embodiment, the electromagnetic resetting component comprises a reset pin configured such that when pushed, the reset pin causes the electromagnetic resetting component to be energized, thereby causing the movable assembly to move towards the second position.

The electromagnetic resetting component may further comprise a reset button positioned in relation to the reset pin and the locking member such that when pushed, the reset button generates a force to push both the reset pin and the first end portion of the locking member to move along a fourth direction opposite to the third direction.

When the locking member moves alone the fourth direction to lower the second portion of the locking member below the bottom edge of the blocking member, the movable assembly is released to move from the first position to the second portion.

In one embodiment, the blocking member is molded with the lateral side of the movable assembly. In another embodiment, the blocking member is secured onto the lateral side of the movable assembly by mounting means, where the mounting means includes glue, pegs, screws, and/or welding.

In one embodiment, the resilient member includes a spring.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE PRESENT INVENTION

Figure 1:
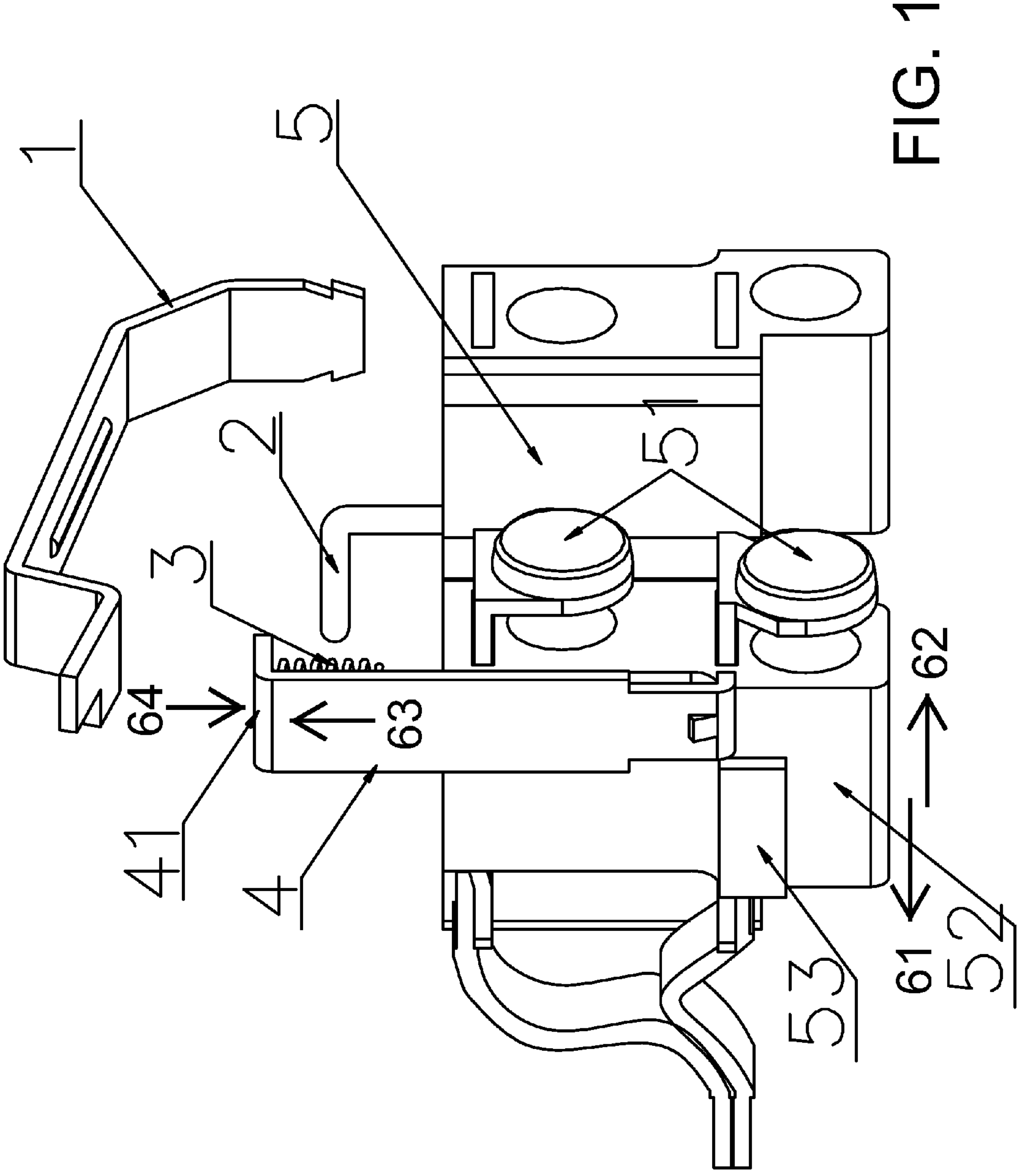
FIG. 1 shows a partially perspective view of a GFCI with a locking mechanism according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

In accordance with the purposes of this invention, as embodied and broadly described herein, this invention, in one aspect, relates to a locking mechanism and its application in a ground fault circuit interrupter (GFCI) for protecting the GFCI from being faultily reset.

Figure 2:
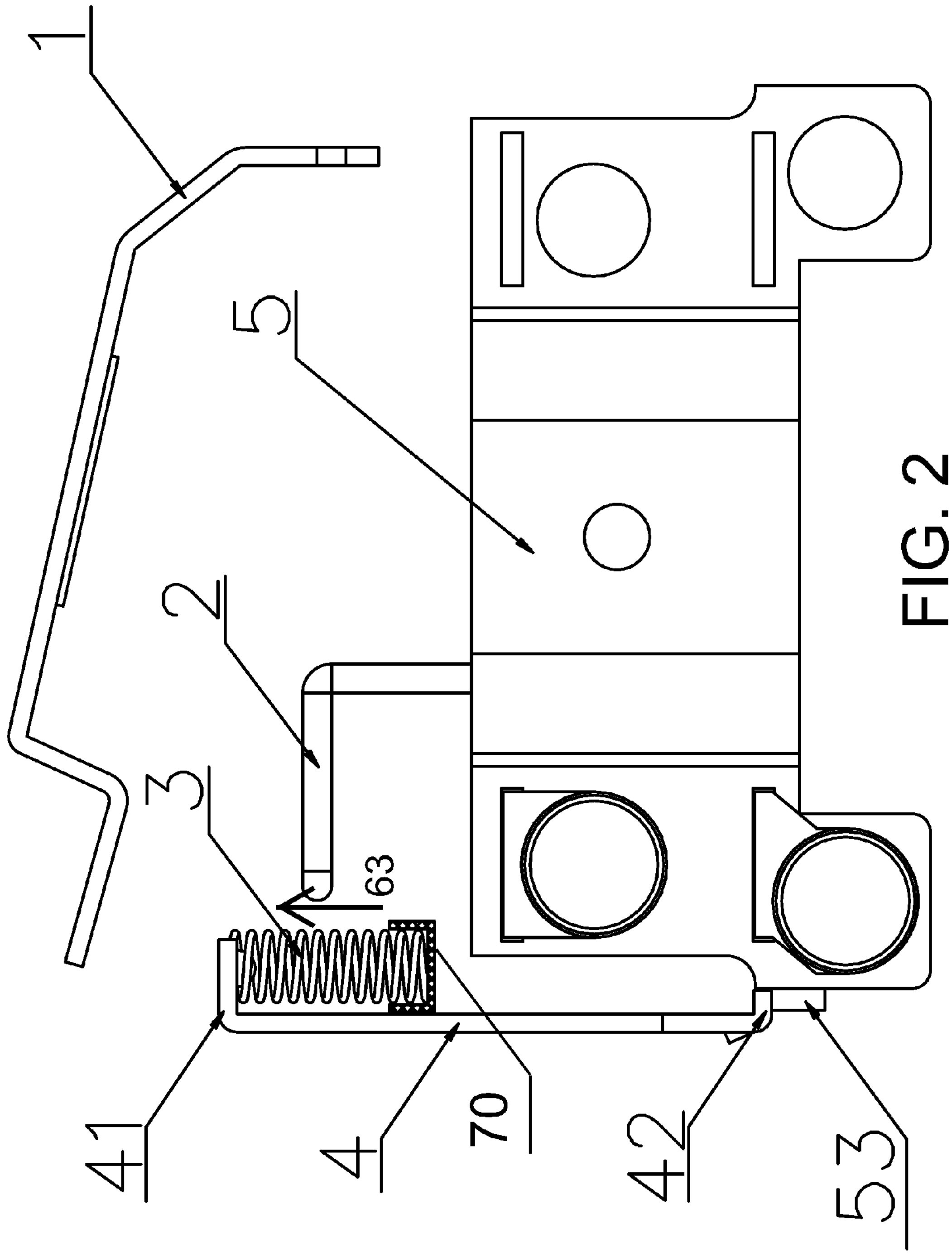
FIG. 2 shows the locking mechanism in a first state.
Figure 3:
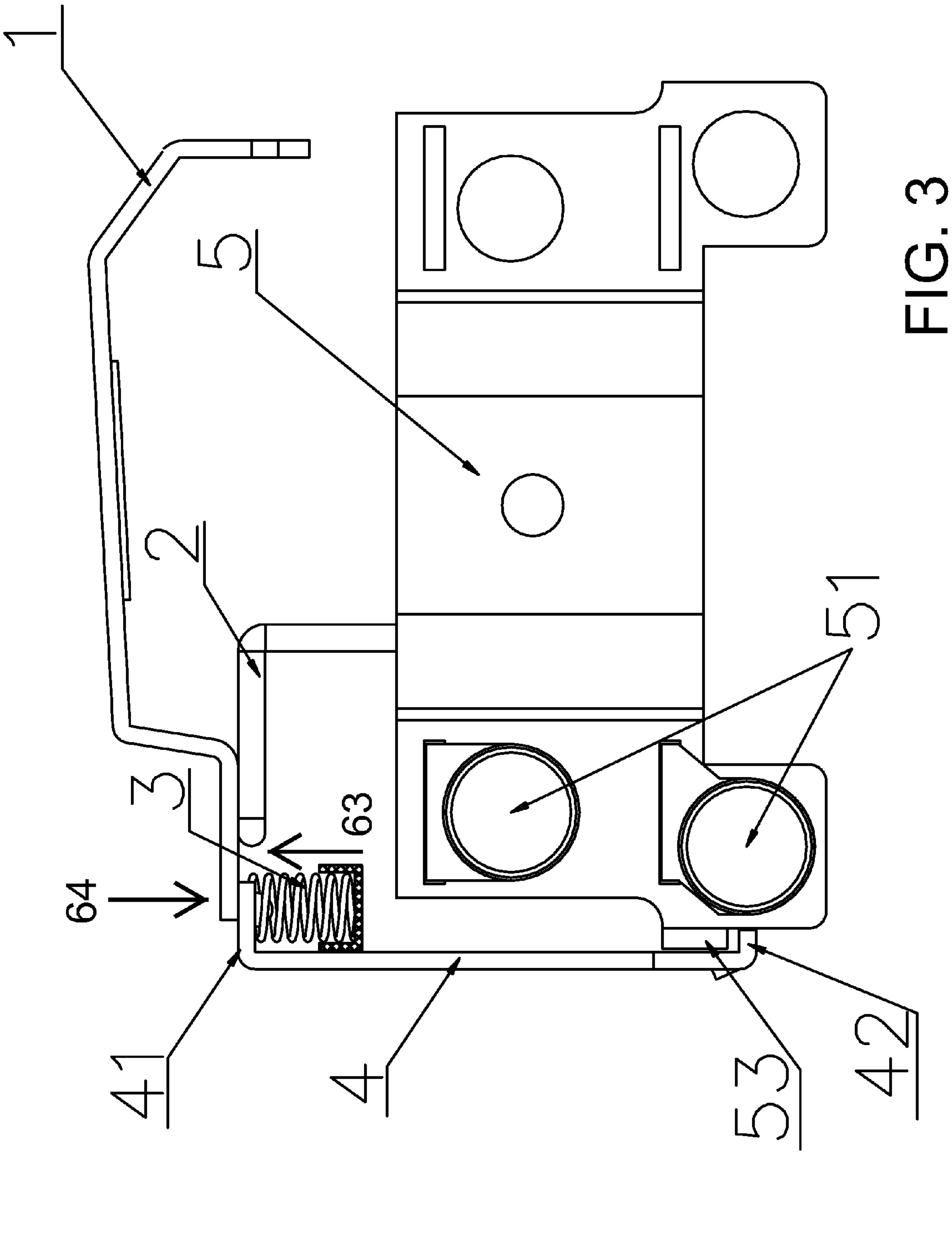
FIG. 3 shows the locking mechanism in a second state.

FIGS. 1-3 show partially a GFCI having a locking mechanism according to one embodiment of the present invention. Particularly, FIGS. 1-3 show the locking mechanism engaged with a tripping and resetting mechanism 5 of the GFCI. The tripping and resetting mechanism 5 includes a movable assembly 52, a pair of movable contact holders each having one movable contact 51, and a pair of fixed contact holders each having one fixed contact (not shown). The movable assembly 52 is configured to move from a first position to a second position along a first direction 61 and from the second position to the first position along a second direction 62 opposite to the first direction 61 such that when the GFCI is tripped, the movable assembly 52 is in the first position, and when the GFCI is reset, the movable assembly 52 is in the second position. The movable contact holders are engaged with the movable assembly 52, so that the movable assembly 52 causes movement of the pair of movable contact holders when it moves from the first position to the second position and from the second position to the first position. Each movable contact 51 is arranged for contacting a respective fixed contact. When the movable assembly 52 is in the first position in which each fixed contact is separated from the respective movable contact 51, while the movable assembly 52 is in the second position in which each fixed contact is in contact with the respective movable contact.

The locking mechanism includes a locking member 4, a resilient member 3 and a blocking member 53.

As shown in FIG. 1, the blocking member 53 is secured onto a lateral side of the movable assembly 52. In one embodiment, the blocking member is molded with the lateral side of the movable assembly 52. In another embodiment, the blocking member 53 is secured onto the lateral side of the movable assembly 52 by mounting means. For example, the blocking member 53 is mounted onto the lateral side of the movable assembly 52 by glue, pegs, screws, welding, or any combination of them.

The resilient member 3 has one end secured in a recess 70 of a fixed structure of the GFCI. For example, the fixed structure is an internally fixed broad of the GFCI, which does not move when the movable assembly 52 moves. The resilient member 3 is configured to have an expanding force along a third direction 63 perpendicular to the first and second directions 61 and 62. The resilient member 3 is corresponding to a spring or the like.

The locking member 4 has a first end portion 41 positioned against the resilient member 3, a second end portion 42 positioned in relation to the blocking member 53, and a body portion defined between the first end portion 41 and the second end portion 42. Each end portion 41/42 is bended from the body portion.

For such an arrangement, when the movable assembly 52 is in the first position, as shown in FIGS. 1 and 2, the expanding force (along the third direction 63) of the resilient member 3 applied to the first end portion 41 of the locking member 4 causes the second end portion 42 of the locking member 4 to be positioned against a lateral side edge of the blocking member 53 so that no movement of the movable assembly 52 from the first position to the second position along the second direction 62 is allowed. When a force exceeding the expanding force of the resilient member is applied along a fourth direction 64 opposite to the third direction 63 to the first end portion 41 of the locking member 4, it causes the locking member 4 to move along the fourth direction 64 so as to lower the second portion 42 of the locking member 4 below the bottom edge of the blocking member 53, as shown in FIG. 3, whereby the movable assembly 52 is released to be movable from the first position to the second portion along the second direction 62. As discussed below, when the force is applied to the first end portion 41 of the locking member 4, so as to release the movable assembly 52 from the first position, it triggers to generate a electromagnetic force alone the second direction 62 that causes the movable assembly 52 to move from the first position to the second position.

In one embodiment, the tripping and resetting mechanism 5 also includes an electromagnetic tripping component configured such that when energized, the electromagnetic tripping component generates a first electromagnetic force (along the first direction 61) that causes the movable assembly 52 to be in the first position; and an electromagnetic resetting component configured such that when energized, the electromagnetic resetting component generates a second electromagnetic force (along the second direction 62) that causes the movable assembly 52 to be in the second position. The electromagnetic tripping component and electromagnetic resetting component can be different from one another.

The electromagnetic resetting component may includes a reset pin 2 configured such that when pushed, the reset pin 2 causes the electromagnetic resetting component to be energized, thereby causing the movable assembly 52 to move towards the second position. The electromagnetic resetting component may further includes a reset button/bracket 1 positioned in relation to the reset pin 2 and the locking member 4 such that when pushed, the reset button/bracket 1 generates a force (along the fourth direction 64) to push both the reset pin 2 and the first end portion 41 of the locking member 4 to move along the fourth direction 64. When the locking member 4 is pushed to move alone the fourth direction 64 to lower the second portion 42 of the locking member 4 below the bottom edge of the blocking member 53, the movable assembly 52 is released to move from the first position to the second portion along the first direction 61. Meanwhile, the electromagnetic resetting component is energized, and the second electromagnetic force (along the second direction 62) is generated, which causes the movable assembly 52 to move from the first (tripping) position to the second (resetting) position. In this case, the second (bended) portion 42 of the locking member 4 is positioned under the bottom edge of the blocking member 53. When the push force applied to the locking member 52 is released, the expending force of the resilient member 3 pulls up the locking member 4 so that the second (bended) portion 42 of the locking member 4 is against the bottom edge of the blocking member 53 and no movement of the locking member 4 along the third direction is allowed. Accordingly, the movable assembly 52 stays in the second (resetting) position in which each fixed contact is in contact with the respective movable contact, and the resetting operation is finished.

Further, when the GFCI is tripped responsively to the detection of an abnormal current, the electromagnetic tripping component is energized and the first electromagnetic force (along the first direction 61) is generated, which causes the movable assembly 52 to move from the second (resetting) position to the first (tripping) position. Meanwhile, due to the expending force of the resilient member 3, the locking member 4 moves along the third direction 63, thereby positioning the second end portion 42 of the locking member 4 against a lateral side edge of the blocking member 53 so that no movement of the movable assembly 52 from the first (tripping) position to the second (resetting) position along the second direction 62 is allowed.

Thus, according to the present invention, if the GFCI is preset in the tripping state/position in manufacture, or tripped responsively to the detection of an abnormal current in operation, that is, the movable assembly 52 is in the first (tripping) position in which the movable contacts 51 are separated from the respective fixed contacts, the movable assembly 52 will stay in the first position, until a manual reset operation is performed. No vibrations can cause the movable assembly 52 to move from the first (tripping) position to the second (resetting) position according to the present invention.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A locking mechanism for protecting a ground fault circuit interrupter (GFCI) from being faultily reset, wherein the GFCI has a movable assembly movable from a first position to a second position along a first direction and from the second position to the first position along a second direction opposite to the first direction, such that when the GFCI is tripped, the movable assembly is in the first position, and when the GFCI is reset, the movable assembly is in the second position, comprising:

(a) a blocking member secured onto a lateral side of the movable assembly;

(b) a resilient member configured to have an expanding force along a third direction perpendicular to the first direction; and (c) a locking member having a first end portion positioned against the resilient member, a second end portion positioned in relation to the blocking member, and a body portion defined between the first end portion and the second end portion, each end portion bended from the body portion, wherein when the movable assembly is in the first position, the expanding force of the resilient member applied to the first end portion of the locking member causes the second end portion of the locking member to be positioned against the blocking member so that no movement of the movable assembly from the first position to the second position is allowed.

2. The locking mechanism of claim 1, wherein when a force exceeding the expanding force of the resilient member is applied along a fourth direction opposite to the third direction to the first end portion of the locking member, it causes the locking member to move along the fourth direction so as to lower the second portion of the locking member below the bottom edge of the blocking member, whereby the movable assembly is released to be movable from the first position to the second portion.

3. The locking mechanism of claim 1, wherein the blocking member is molded with the lateral side of the movable assembly.

4. The locking mechanism of claim 1, wherein the blocking member is secured onto the lateral side of the movable assembly by mounting means.

5. The locking mechanism of claim 4, wherein the mounting means includes glue, pegs, screws, and/or welding.

6. The locking mechanism of claim 1, wherein the resilient member includes a spring.

7. A ground fault circuit interrupter (GFCI), comprising:

(a) a pair of fixed contact holders, each fixed contact holder having at least one fixed contact at one end;

(b) a pair of movable contact holders, each movable contact holder having at least one movable contact at one end, each movable contact being arranged for contacting a respective fixed contact;

(c) a movable assembly configured to move from a first position in which each fixed contact is separated from the respective movable contact to a second position in which each fixed contact is in contact with the respective movable contact, along a first direction and from the second position to the first position along a second direction opposite to the first direction, the movable assembly causing movement of the pair of movable contact holders when it moves from the first position to the second position and from the second position to the first position; and (d) a locking mechanism comprising:

(i) a blocking member secured onto a lateral side of the movable assembly;

(ii) a resilient member configured to have an expanding force along a third direction perpendicular to the first direction; and (iii) a locking member having a first end portion positioned against the resilient member, a second end portion positioned in relation to the blocking member, and a body portion defined between the first end portion and the second end portion, each end portion bended from the body portion, wherein when the movable assembly is in the first position, the expanding force of the resilient member applied to the first end portion of the locking member causes the second end portion of the locking member to be positioned against the blocking member so that no movement of the movable assembly from the first position to the second position is allowed.

8. The GFCI of claim 7, further comprising:

(a) an electromagnetic tripping component configured such that when energized, the electromagnetic tripping component generates a first electromagnetic force that causes the movable assembly to be in the first position; and (b) an electromagnetic resetting component configured such that when energized, the electromagnetic resetting component generates a second electromagnetic force that causes the movable assembly to be in the second position, wherein the electromagnetic tripping component and electromagnetic resetting component are different from one another.

9. The GFCI of claim 8, wherein the electromagnetic resetting component comprises a reset pin configured such that when pushed, the reset pin causes the electromagnetic resetting component to be energized, thereby causing the movable assembly to move towards the second position.

10. The GFCI of claim 9, wherein the electromagnetic resetting component further comprises a reset button positioned in relation to the reset pin and the locking member such that when pushed, the reset button generates a force to push both the reset pin and the first end portion of the locking member to move along a fourth direction opposite to the third direction.

11. The GFCI of claim 10, wherein when the locking member moves alone the fourth direction to lower the second portion of the locking member below the bottom edge of the blocking member, the movable assembly is released to move from the first position to the second portion.

12. The GFCI of claim 7, wherein the blocking member is molded with the lateral side of the movable assembly.

13. The GFCI of claim 7, wherein the blocking member is secured onto the lateral side of the movable assembly by mounting means.

14. The GFCI of claim 13, wherein the mounting means includes glue, pegs, screws, and/or welding.

15. The GFCI of claim 7, wherein the resilient member includes a spring.

* * * * *